(12) United States Patent
Kim et al.

(10) Patent No.: US 9,705,816 B2
(45) Date of Patent: Jul. 11, 2017

(54) METHOD AND APPARATUS FOR ALLOCATING RESOURCE REFLECTING ADAPTIVE EVALUATION IN CLOUD COMPUTING FOR HIGH-THROUGHPUT COMPUTING

(71) Applicant: KOREA INSTITUTE OF SCIENCE & TECHNOLOGY INFORMATION (KISTI), Daejeon-si (KR)

(72) Inventors: Seoyoung Kim, Seoul (KR); Eunkyu Byun, Daejeon (KR); Soonwook Hwang, Daejeon (KR); Seokkyoo Kim, Seoul (KR); Jik-soo Kim, Daejeon (KR); Sangwan Kim, Daejeon (KR); Seungwoo Rho, Seoul (KR)

(73) Assignee: Korea Institute of Science & Technology Information (KISTI), Daejeon-si (KR)

( * ) Notice: Subject to any disclaimer, the term of this patent is extended or adjusted under 35 U.S.C. 154(b) by 423 days.

(21) Appl. No.: 14/326,618

(22) Filed: Jul. 9, 2014

(65) Prior Publication Data
US 2015/0019737 A1    Jan. 15, 2015

(30) Foreign Application Priority Data

Jul. 9, 2013   (KR) .................. 10-2013-0080181
Jul. 9, 2013   (KR) .................. 10-2013-0080182

(51) Int. Cl.
*G06F 15/173*   (2006.01)
*H04L 12/911*   (2013.01)
*G06F 9/50*   (2006.01)
*H04L 29/08*   (2006.01)
*H04L 29/06*   (2006.01)

(52) U.S. Cl.
CPC ............ *H04L 47/70* (2013.01); *G06F 9/5061* (2013.01); *H04L 29/06* (2013.01); *H04L 29/08072* (2013.01); *H04L 29/08144* (2013.01)

(58) Field of Classification Search
USPC ........................................ 709/226
See application file for complete search history.

(56) References Cited

U.S. PATENT DOCUMENTS

2003/0187973 A1* 10/2003 Wesley .................. H04L 29/06
                                                                  709/224
2008/0154626 A1*  6/2008 Gounares ............... G06Q 10/10
                                                                  705/51

(Continued)

OTHER PUBLICATIONS

KIPO Office Action issued in Korean Patent Application No. 10-2013-0080181 dated Jan. 19, 2015.

(Continued)

*Primary Examiner* — Razu A Miah
(74) *Attorney, Agent, or Firm* — RatnerPrestia

(57) ABSTRACT

Disclosed is a method of efficiently allocating resources in a cloud computing system of the High-Throughput Computing (HTC) field. In more detail, a cloud resource allocation model is proposed in which accumulated job histories are analyzed, a correlation between a performance factor and the job properties is extracted, a factor which is greatly influential in a task performance is identified based on the result of the analyzing and the extracting and is applied to subsequent resource allocations, and reanalysis is performed adaptively.

13 Claims, 5 Drawing Sheets

(56) References Cited

U.S. PATENT DOCUMENTS

| | | | | |
|---|---|---|---|---|
| 2010/0131957 | A1* | 5/2010 | Kami | G06F 9/5077 718/104 |
| 2012/0066390 | A1* | 3/2012 | Salsbery | G06F 11/3013 709/226 |
| 2012/0131591 | A1* | 5/2012 | Moorthi | G06Q 10/06 718/104 |
| 2012/0233613 | A1* | 9/2012 | Shimogawa | G06F 9/45558 718/1 |
| 2012/0278221 | A1* | 11/2012 | Fuller | G06Q 30/08 705/37 |
| 2012/0284408 | A1* | 11/2012 | Dutta | G06F 9/5066 709/226 |
| 2013/0007753 | A1* | 1/2013 | Jain | G06F 9/46 718/103 |
| 2013/0111035 | A1* | 5/2013 | Alapati | G06F 9/5072 709/226 |
| 2013/0185433 | A1* | 7/2013 | Zhu | H04L 67/303 709/226 |
| 2013/0262556 | A1* | 10/2013 | Xu | G06F 9/5027 709/202 |
| 2013/0304923 | A1* | 11/2013 | Clay | G06F 9/5027 709/226 |
| 2013/0346614 | A1* | 12/2013 | Baughman | G06F 9/5083 709/226 |
| 2014/0189702 | A1* | 7/2014 | Yan | G06F 9/5027 718/104 |

OTHER PUBLICATIONS

Wood, "Principal Component Analysis," Dec. 8, 2009.
Kim, "A Science Cloud Provisioning Model Using Statistical Analysis of Job History," Dec. 2011 (w/English Abstract).

* cited by examiner

Fig. 2

| Resource | CPU clock per node | Stability | Bandwidth | Distance |
|---|---|---|---|---|
| aurora | 1313.882 | 100 | 750 | 2 |
| f32 | 8672.291 | 92 | 763 | 0 |
| komolongma | 5120.5 | 100 | 800 | 13 |
| luke | 6000 | 95 | 1000 | 0 |
| nucleus | 2193 | 100 | 800 | 1 |
| rocks-52 | 2388.2 | 100 | 623 | 14 |
| rocks-153 | 3200 | 97 | 827 | 14 |
| sakura | 1815.647 | 98.9 | 742 | 0 |
| sirius | 1400 | 80 | 863 | 2 |

METHOD AND APPARATUS FOR ALLOCATING RESOURCE REFLECTING ADAPTIVE EVALUATION IN CLOUD COMPUTING FOR HIGH-THROUGHPUT COMPUTING

CROSS REFERENCE TO RELATED APPLICATIONS

This application claims priority to Korean Patent Application Nos. 10-2013-0080181, filed Jul. 9, 2013 and 10-2013-0080182, filed Jul. 9, 2013, the contents of such applications being incorporated by reference herein.

BACKGROUND OF THE INVENTION

Field of the Invention

The present disclosure relates to a method of efficiently allocating resources by analyzing a job history in a cloud computing system of a high-throughput computing field, and an apparatus used therefor.

Description of the Prior Art

In the computational science field, there are various computing paradigms according to application characteristics thereof. Further, the computing paradigms are approximately classified into High-Performance Computing (HPC), High-Throughput Computing (HTC), Many-Tasks Computing (MTC), etc. Although various researches on optimizing a performance of each paradigm have been conducted, an optimization technology suitable for a computing technology being rapidly changed is still required. In particular, the HTC corresponds to a paradigm which is actively adopted and utilized in the bioinformatics field, the new drug discovery field and the high-energy physics field, and a technology of optimizing and improving the performance of the HTC is required more and more. Since the HTC is mainly consisting of a large amount of tasks and commonly uses a technology such as parameter sweeping, when a large number of job histories are properly analyzed, a relationship between the performance of the application and the job properties can be identified, and the identified characteristic can be applied to various distributed computing technologies to make computing efficient.

Meanwhile, with the development of cloud computing, researchers of various science fields can receive a super computer which is essential to research, through an on-demand service, and research environments have been expanded as it becomes possible to expand dynamic resources. In this way, a science cloud has received attention as a new research environment paradigm in various recent science fields. However, since it is difficult to configure a rapid and dynamic virtual task space suitably for the demand of a user, it is considered important that a proper experimental environment considering application characteristics is configured before the execution of tasks. In addition, a scheduling mechanism which provides a virtual machine which secures a performance at an optimum level is also required.

SUMMARY OF THE INVENTION

An aspect of the present disclosure is to provide a method of efficiently allocating resources in a cloud computing system of the High-Throughput Computing (HTC) field. In more detail, a cloud resource allocation model is proposed in which accumulated job histories are analyzed, a correlation between a performance factor and the job properties is extracted, a factor which is greatly influential in a task performance is identified based on the result of the analyzing and the extracting and is applied to subsequent resource allocations, and reanalysis is performed adaptively.

An aspect of the present disclosure is to provide a method of allocating a cloud resource by a cloud resource management device. The method includes calculating an influence index of each of a factor relating to an application characteristic and a factor relating to a computing resource, by analyzing a previously-performed task profile; selecting a first representative factor having the largest influence index among the factors relating to the application characteristic and a second representative factor having the largest influence index among the factors relating to the computing resource, based on the calculated result; normalizing an application parameter corresponding to the first representative factor among an application parameter of a requested task; selecting a task profile having a normalization value equal to the normalized parameter value of the requested task among the previously-performed task profiles, with respect to the first representative factor; selecting one task profile among the selected task profiles based on the second representative factor; allocating a computing resource corresponding to the selected one task profile to the requested task; and after executing the requested task based on the allocated computing resource, evaluating the executed task by comparing the execution time period of the executed task with the execution time period of the selected task profile.

Another aspect of the present invention is to provide a cloud resource management device. The cloud resource management device includes an influence index calculation unit configured to calculate an influence index of each of a factor relating to an application characteristic and a factor relating to a computing resource, by analyzing a previously-performed task profile; a representative factor selection unit configured to select a first representative factor having the largest influence index among the factors relating to the application characteristic and a second representative factor having the largest influence index among the factors relating to the computing resource, based on the calculated result; a profile reference unit configured to select a task profile having the first representative factor value equal to that of the requested task among the previously-performed task profile, and to select one task profile among the selected task profiles based on the second representative factor; a resource allocation unit configured to allocate a computing resource corresponding to the selected one task profile to the requested task; and an execution task evaluation unit configured to, after executing the requested task based on the allocated computing resource, evaluate the executed task by comparing the execution time period of the executed task with the execution time period of the selected task profile.

Embodiment of the present disclosures can quantify the influence of a factor relating to an application characteristic and/or a computing resource through various statistical analyses, can stably select resources by utilizing the quantified information to select resources for generating a subsequent virtual environment, can provide a rapid provisioning service to a user, and can provide a virtual environment optimal for executing applications. Further, embodiments of the present disclosures can provide a scheduling and cloud provisioning method which reflects a resource environment changed consistently.

BRIEF DESCRIPTION OF THE DRAWINGS

The above and other objects, features and advantages of the present invention will be more apparent from the following detailed description taken in conjunction with the accompanying drawings, in which:

FIG. 2 is a table illustrating information of a factor relating to a computing resource;

DETAILED DESCRIPTION OF THE EXEMPLARY EMBODIMENTS

Figure 1:
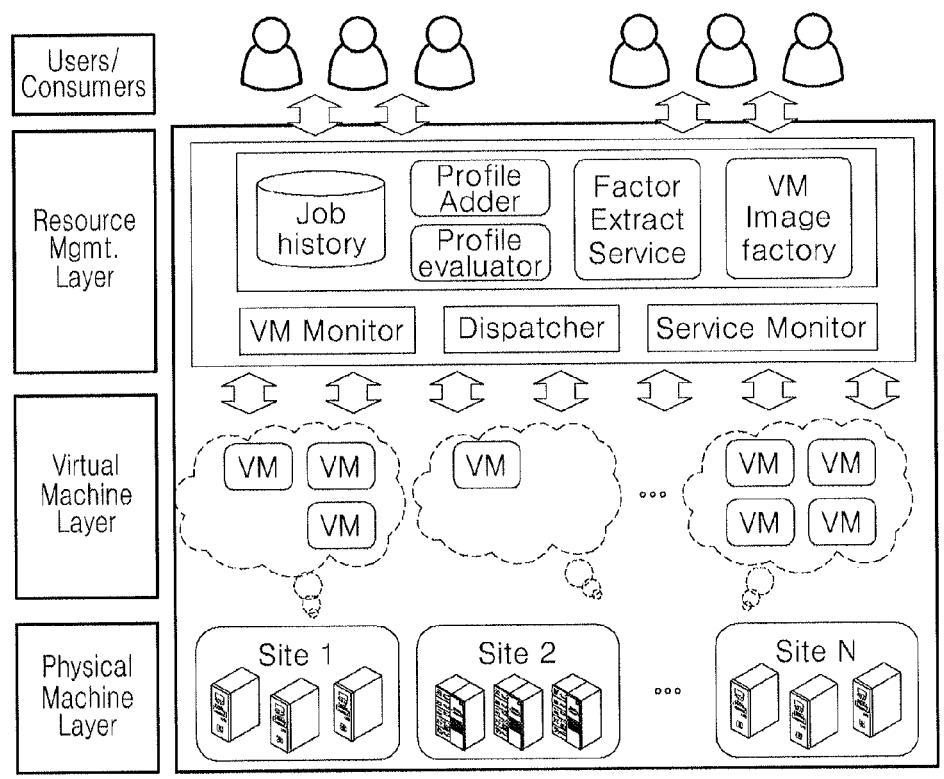
FIG. 1 illustrates a cloud resource management device according to an embodiment of the present disclosure.

Hereinafter, exemplary embodiments of the present invention will be described in detail with reference to the accompanying drawings. Throughout the drawings, the same or similar elements are provided with the same reference numeral, and a repetitive description thereof will be omitted. Further, in the following description of the present invention, a detailed description of known technologies incorporated herein will be omitted when it may make the subject matter of the present disclosure rather unclear. Further, it should be noted that the accompanying drawings are intended only for the easy understanding of the technical idea of the present invention, and the spirit of the present invention should not be construed as being limited by the accompanying drawings. In addition to the accompanying drawings, the spirit of the present invention should be construed to cover all modifications, equivalents, and alternatives thereof.

In a case of an application of a science field such as High-Throughput Computing (HTC), a characteristic thereof and a desired computing environment is changed according to a detailed domain, so that detailed identification of the characteristic of the application is required. That is, analyzing use histories by applying various statistical technologies and identifying an interaction between the characteristic of the application and computing environment attributes are required. Meanwhile, mainly, there are a large number of use (task) histories, and the use (task) histories include various aspects of factors. Accordingly, it is important to find meaningful data among a large amount of data in order to find the characteristic thereof using the use history. In particular, in the case of the HTC, a plurality of operations is executed for a singular performance using a large number of resources, so that task histories should be properly processed. To this end, an embodiment of the present disclosure identifies a correlation between factors using a principal component analysis technique, and performs proper analysis and utilization by reducing dimensions of pieces of data mainly using an influential factor.

Meanwhile, a science cloud grafts an advantage of a cloud computing technology using a virtualization technology as a main means onto an advantage of an e-science to provide a virtual task space having an improved expandability and an improved flexibility. That is, the science cloud provides a function of allowing a researcher to borrow and use resources required for research for a desired time period. Thus, efficiency and flexibility as well as the scale of research can be greatly improved using a service of a science cloud which can dynamically provide an infrastructure matching with research characteristics of various fields. At this point, the cloud computing technology may be highly utilized as a next generation research environment subsequent to the e-science technology.

In such a cloud computing environment, resource management and control technology suitable for a cloud environment is required in order to provide resources while complying with a Quality of Service (QoS) and a Service-Level Agreement (SLA) for tasks required by users. That is, the cloud service should provide a flexible and easy execution environment to operate applications of all of users, and should provide a mechanism which can secure the performance of an application being used by a user.

For example, in a case of an application of the science field, a characteristic thereof and a desired computing environment are changed according to a detailed domain, so that detailed identification of the characteristic of the application is required. That is, analyzing use histories by applying various statistical technologies and identifying an interaction between the characteristic of the application and cloud computing environment attributes are required. Meanwhile, mainly, there is a large number of use histories, and the use histories include various factors. Thus, it is important to find meaningful data which represents a large amount of data in order to find the characteristic thereof using the use histories. To this end, an embodiment of the present disclosure identifies a correlation structure between factors by using a statistical technique (factor analysis, principal component analysis, a spearman correlation coefficient, spearman rank correlation extraction, etc.) based on a correlation analysis, and reduces, properly interprets, and utilizes resources of pieces of data mainly using an influential factor.

FIG. 1 illustrates a structure of a cloud resource management device according to an embodiment of the present disclosure.

A user transmits, to a cloud system, a computing service request for performing an application (an application program) regardless of geographical location. A resource management device of the cloud system having received the request identifies a characteristic of an application used for the requested computing, selects a virtual machine to be generated based on a factor extraction service, and determines a specific physical resource site in which the virtual machine is to be disposed. The resource management device may dispose the virtual machine in the determined resource, may schedule a task, and may include histories of the performing in a profile storage place after the execution. Further, the resource management device evaluates a profile based on the performing result. The performed virtual machine may be provided in a form of allocating and using resources within the same actual physical machine, and may be provided in an independent and discerned form within the one same actual resource. The physical machines are configured by various servers, networks, etc. which correspond to actual resources for satisfying requirements of a user.

The resource management device may be utilized in the HTC field, and may analyze and/or manage accumulated task profiles.

The resource management device extracts a large number of HTC tasks and resource attributes for performing such tasks, and determines a factor aggregation for application and/or resources based on the extracted attributes. The above two steps may correspond to a factor decision layer.

The resource management device may quantify each task history and perform an analysis operation, based on factors determined in the factor decision layer. The statistical technique such as the principal component analysis is applied in order to perform the analysis operation, and a pre-processing for performing a series of normalization processes for history data may be further performed before performing the analysis operation. A process such as a post-processing may also be performed with respect to the result data obtained through the principal component analysis, so as to select only important data. A representative factor and a representative profile which are extracted through such processes may be used for selecting various resources or performing task scheduling, and tasks performed on various computing resources may also be accumulated consistently. The accumulated history data is reanalyzed when a predetermined condition is satisfied. Such processes are repeatedly performed, and the process may include the analysis layer.

An application transmitting a computing request to a cloud has a characteristic in which an execution time period, a task execution performance, etc. are changed according to a characteristic of a factor (parameter). Although the factors may be variously defined according to attributes of tasks to be performed or a form of accumulated profiles, factors influential in the task execution time period may include ① a factor relating to a characteristic of an application (e.g. a parameter value required when the application is performed—a variable of an objective function, a repeated count, etc., a task size—the number of cores required during the execution, a length—a code length of an execution application, etc.) and ② a factor relating to computing resources (a performance of a Central Processing Unit (CPU)—a clock speed of the CPU, the number of cores in each CPU, the size of a memory, a network bandwidth between the computing resources at a task submission location, etc.).

As an example of setting an application factor, the factors to be used to analyze task histories (profiles) accumulated by a predetermined application A will be defined in the following Table 1.

TABLE 1

|  |  | Factor name | Factor classification |
|---|---|---|---|
| f1 | V1 | AMACH | Application factor |
| f2 | V2 | RE |  |
| f3 | V3 | AOA |  |
| f4 | V4 | ITMAX |  |
| f5 | V5 | CPU clock/1 node | Resource factor |
| f6 | V6 | Stability |  |
| f7 | V7 | Bandwidth |  |
| f8 | V8 | Distance |  |

In Table 1, variables V1 to V4 directly used during HTC-based application execution are defined as variables of AMACH, RE, AOA and ITMAX which are frequently used. The variables of AMACH, RE and AOA corresponds to a Mach number, a Reynolds number, and an angle of an attack, respectively, and the variable of ITMAX implies a repeated count. These variables are configured and allocated to be a combination of values within a range desired by a user, and are used as input values during the execution. Meanwhile, the CPU clock per each node, the stability of each cluster (the number of times of successes/the number of times of total tries), the band width and the cluster location are defined as resource factors with reference to monitoring information of resources.

The task profiles may be accumulated as in the following Table 2 according to the factor information defined in the above Table 1. At this time, the cloud resource management device may normalize the factors into five steps according to a proportional relationship between each of the application/resource factors and the execution time period. (For example, values corresponding to the top 20%, 40%, 60% and 80% of the total values after sorting the total value in descending order/ascending order, and scoring one to five points using a minimum value and a maximum value as a boundary value).

TABLE 2

| id | $j_{id}$ | | | | r | s | VM (id) | $T_{id}$ |
|---|---|---|---|---|---|---|---|---|
|  | f1 | f2 | f3 | f4 |  |  |  |  |
| 110 | 0.8 | 500000 | 8 | 10000 | Sakura | Done | vm4 | 43310 |
| 111 | 0.7 | 5 | 6 | 10000 | Luke | Done | vm1 | 3275 |

The normalized task profile will be expressed by the following Table 3. At this time, in the case of the resource factors, Table 2 may be scored into five steps and then reflected. For example, in Table 2, since a history of id 110 is performed in a sakura cluster, f5 is expressed as a normalized value "2" with reference to the corresponding range of the CPU clock thereof.

TABLE 3

| id | $j_{id}$ | | | | r | | | | VM | |
|---|---|---|---|---|---|---|---|---|---|---|
|  | f1 | f2 | f3 | f4 | f5 | f6 | f7 | f8 | s | (id) | $T_{id}$ |
| 110 | 4 | 3 | 4 | 3 | 2 | 5 | 2 | 1 | Done | vm4 | 43310 |
| 111 | 3 | 1 | 4 | 3 | 5 | 2 | 5 | 1 | Done | vm1 | 3275 |

The resource management device normalizes all of the factors of the existing task profile as in the above Table 3, and then analyzes the most influential factor through the Principal Component Analysis (PCA) technique.

A process of performing the PCA technique will be described as follows. When there are n number of profiles and d number of factors, an [n×d] matrix J is configured so that a covariance matrix Cov(J) is calculated by the following Equation (1).

$$\mathrm{Cov}(J) = \frac{1}{n-1}(J \cdot J^T) \quad (1)$$

Further, the resource management device calculates an eigen value and an eigen vector through the following Equation (2).

$$\mathrm{Cov}(J)v_\lambda = \lambda v_\lambda \quad (2)$$

In Equations (1) and (2), Cov(J) is a covariance matrix of the matrix J, the matrix J is an [n×d] matrix having n number of task profiles and d number of factors, and $J^T$ is a transposed matrix of the matrix J. Further, $\lambda$ is an eigen value, and $v_\lambda$ is an eigen vector.

When the pair of eigen vector/value corresponding to Cov(J) is calculated, the d number of pairs of eigen vector/value is generated, and a factor having the largest value among the d number of generated eigen values corresponding to the factors becomes the "most influential" factor. Further, the resource management device calculates influence indexes (principal component points) of all tasks included in the task histories, using an eigen vector corresponding to an eigen value having the largest value. At this time, a factor having the largest influence index (principal component point) becomes a representative factor. The representative factor may be classified into a first representative factor having the largest influence index among the factors relating to the application characteristic and a second representative factor having the largest influence index among the factors relating to the computing resource.

The following Table 4 shows results obtained by calculating influence indexes of 79 task profiles after performing the PCA for the task profiles.

TABLE 4

| | $i_{id}$ | | | | R | | | | |
|---|---|---|---|---|---|---|---|---|---|
| id | f1 | f2 | f3 | f4 | f5 | f6 | f7 | f8 | $T_{id}$ |
| 1 | 2 | 1 | 4 | 3 | 5 | 2 | 5 | 1 | 1483 |
| 2 | 4 | 1 | 4 | 3 | 2 | 5 | 4 | 1 | 1014 |
| | | | | | <-- omitted --> | | | | |
| 78 | 3 | 1 | 4 | 3 | 2 | 5 | 2 | 1 | 1933273 |
| 79 | 3 | 1 | 4 | 3 | 2 | 5 | 2 | 1 | 1919399 |
| Eig_V | 0.18 | 0 | 0 | 0 | 2.33 | 0.46 | 1.16 | 0.85 | |
| Priority | 1 | — | — | — | 1 | 4 | 2 | 3 | |

As the analysis result, in sample profiles, among the factors relating to the application characteristic, the values of f2 to f4 is not changed, and only the value of f1 corresponding to "AMACH" is changed, so that the influence indexed of f2 to f4 is derived as zero. Thus, as the execution result of Equation (1), the f1 having the largest eigen value (influence index) becomes a representative factor (first representative factor), and the f5 corresponding to the CPU clock among the factors relating to the computing resource has the largest influence index (eigen value) so as to become a second representative factor.

Furthermore, the resource management device may calculate a profile (principal component) point for each task profile. For example, a principal component point of a task profile having an id of 1 may be calculated using the following Equation (3).

$$PC\_j1 = -0.04 * [(2-M(f1))/s(f1)] + \ldots + 0.8 * [(1-M(f8))/s(f8)] = 1.716 \quad (3)$$

(M(fi): average of fi, s(fi): standard deviation of fi)

When an eigen vector corresponding to the largest eigen value is equal to Eigen_Vector1=(−0.04, 0, 0, 0, 0.93, 0.25, 0.85, 0.80), values included in the eigen vector imply weighted values of the factors, respectively. Thus, the profile principal component point of the task id 1 is calculated by multiplying the values of the eigen vector indicating the weighted values of the factors by values standardized using a standardized score, which is like Equation (3). A profile calculated by such a process and having the largest principal component point for the task profile may become a representative task profile, and virtual machine environment information of the tasks may be used to prepare a virtual machine environment for a new operation.

When receiving a task execution request, the cloud resource management device selects a task profile having the first representative factor value equal to that of the requested task among the task profiles performed previously. In describing with an example, when task execution having a factor value of {f1(AMACH): 0.7, f2(RE): 5, f3(AOA): 7, f4(ITMAX): 10000} is requested from a user, first, task profiles having the same value of f1(AMACH) which is the most influential among the factors relating to the application characteristic are selected of a set of the existing profiles.

The following Table 5 shows the selected task profiles.

TABLE 5

| | $i_{id}$ | | | | | | VM | |
|---|---|---|---|---|---|---|---|---|
| id | f1 | f2 | f3 | f4 | r | s | (id) | $T_{id}$ |
| 5 | 0.7 | 5 | 7 | 10000 | rocks-52 | Done | vm6 | 9897 |
| 9 | 0.7 | 5 | 7 | 10000 | rocks-52 | Done | vm3 | 1261 |
| 72 | 0.7 | 5 | 7 | 10000 | rocks-52 | Done | vm5 | 907 |
| 73 | 0.7 | 5 | 7 | 10000 | rocks-153 | Done | vm3 | 1482 |
| 76 | 0.7 | 5 | 7 | 10000 | Sakura | Done | vm2 | 1934276 |

The cloud resource management device references a task profile having the shortest execution time period, of which the CPU clock value is large, the CPU clock value corresponding to the representative factor (second representative fact) relating to the resource characteristic, among these task profiles. In the above Table 5, candidate resources "rocks-52" and "rocks-153" can be obtained from task profiles having ids of 72, 9 and 73.

The cloud resource management device allocates computing resources corresponding to the selected one task profile, to the requested task. For example, when the CPU clock for each resource which is a representative resource factor is referenced in FIG. 2, the resource "rocks-153" among the two candidate resources has the higher CPU clock, so as to be selected as a resource to which a task is finally performed.

Further, the cloud resource management device may determine the type of Virtual Machine (VM) which is to be disposed in the selected resource. For example, the cloud resource management device may identify a task profile having a principal component point equal to or larger than a predetermined reference value and a type of VM corresponding to a task profile commonly included in the selected task profile, and may dispose the identified VM in a computing resource corresponding to the selected one task profile.

For example, task profiles having a principal component point calculated through Equation (2) and being equal to or larger than a predetermined reference value are tasks of 5, 18, 19, 20, 26 and 27. Further, when task profiles selected based on the first representative factor is equal to Table 5, the VM vm6 corresponding to the task 5 commonly included in both sides is selected and is disposed in the computing resource. That is, the cloud resource management device disposes a virtual machine vm6 including two CPUs and a memory having a size of 1024 MB (See Table 6) in the cluster "rocks-153" selected as the computing resource, and then schedules tasks to be executed in the corresponding virtual machine.

TABLE 6

| Type of VM | Number of CPU | Memory size |
|---|---|---|
| vm1 | 1 | 128 |
| vm2 | 1 | 256 |
| vm3 | 1 | 512 |
| vm4 | 1 | 1024 |
| vm5 | 2 | 512 |
| vm6 | 2 | 1024 |
| vm7 | 4 | 1024 |

The aforementioned overall cloud provisioning process is summarized as follows. 1) Analyzing accumulated task profiles using a proper statistical analysis such as a principal component analysis. 2) Determining a physical resource in which a virtual machine for task execution is to be disposed and an attribute of the virtual machine, using the result extracted through the analyzing.

Figure 3:
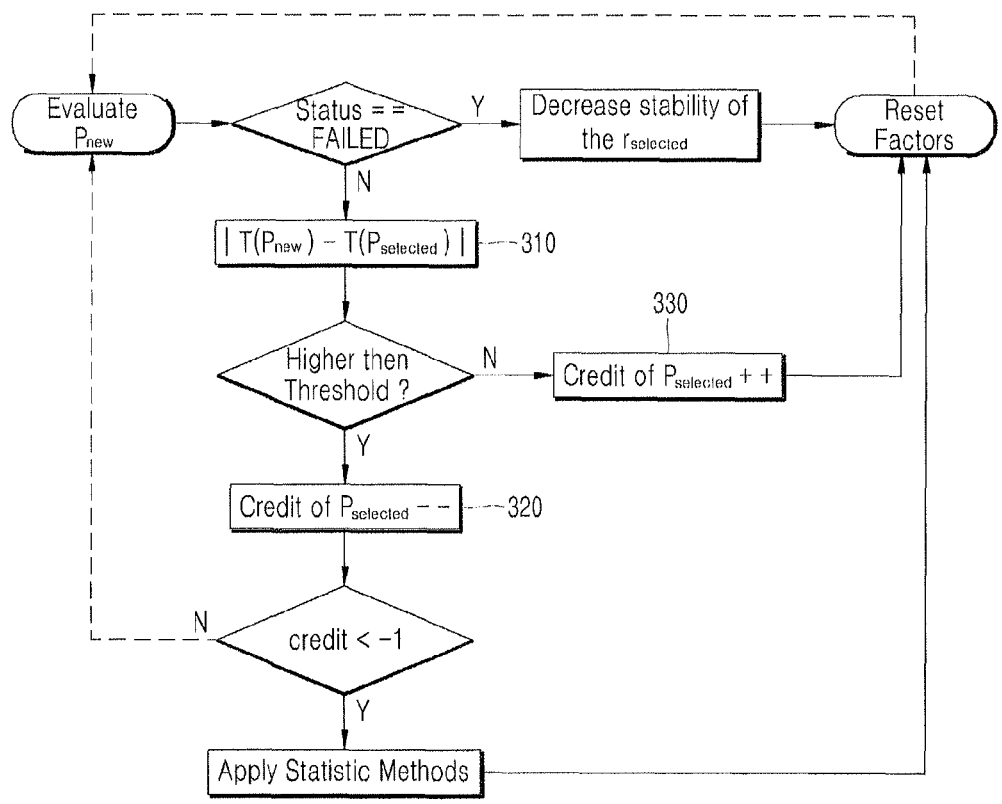
FIG. 3 is a flowchart illustrating a method of evaluating an executed task according to an embodiment of the present disclosure.

FIG. 3 is a flowchart illustrating a method of evaluating an executed task according to an embodiment of the present disclosure.

When execution of the tasks to which resources are allocated through the processes described in FIGS. 1 and 2 is terminated, the cloud resource management device evaluates the execution result of the corresponding task to reflect the evaluation result to a state of a current cloud site (Example: computing resource). When the task execution is successful, a probability that a site (resource) in which the virtual machine is performed is stable is high, and when the task execution is failed, a stability of the site is evaluated as being decreased (Stability (%)=the number of successes/the number of total tries×100). When the task execution result is "successful", the cloud resource management device compares an execution time $T(P_{selected})$ of the task profile which is referenced (that is, selected through the processes described in FIGS. 1 to 2) with an execution time $T(P_{new})$ of the executed task (Step S310). When it is determined in the comparison that an execution time difference is larger than a predetermined threshold value, the cloud resource management device analyzes a factor of a recent task history again, and decreases an evaluation value (credit value) of an executed profile by 1 (Step. S320). When it is determined in the comparison that the execution time difference is smaller than the predetermined threshold value, the cloud resource management device increases an evaluation value (credit value) of the executed profile by 1 (Step S330). An initial value of the evaluation value (credit value) owned by an extracted factor is zero, and when the evaluation value is smaller than −1 (equal to or smaller than −2), the cloud resource management device analyzes the factor of the recent task history again. In this way, the cloud resource management device adaptively updates an execution environment state after performing the task. Through such a task history evaluation process, the cloud resource management device may adapt itself to a change of the computing resources, and may also prevent frequent task history analyzing.

Figure 4:
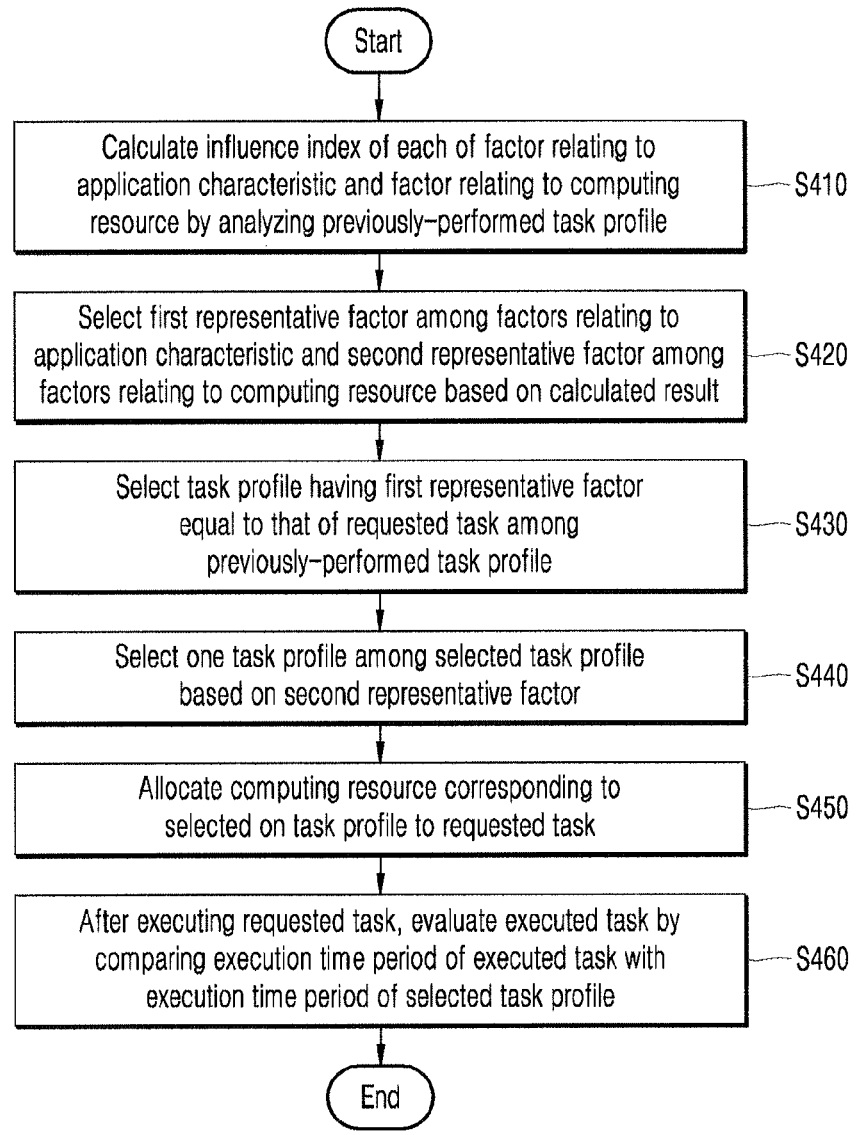
FIG. 4 is a flowchart illustrating a method of allocating a cloud resource according to an embodiment of the present disclosure.

FIG. 4 is a flowchart illustrating a method of allocating a cloud resource according to an embodiment of the present disclosure.

Hereinafter, the aforementioned method of allocating cloud resources may be performed by the cloud resource management device described in FIGS. 1 to 3.

The cloud resource management device may calculate a factor relating to an application characteristic and an influence index of each factor relating to a computing resource, by analyzing the previously-performed task profile (Step S410). To this end, the cloud resource management device may define a factor to be performed by a user and relating to the application characteristic and a factor relating to a computing resource in which tasks are performed, by considering an aspect most closely related to a task performance of an application scheduled to be performed.

At this time, the factor relating to the application characteristic may include at least one of a parameter, a task size and a length. Further, the factor relating to the computing resource may include at least one of a CPU performance, a memory size and a network bandwidth.

The calculating of the influence index may include normalizing a value of each of the factor relating to the application characteristic and the factor relating to the computing resource, and then calculating the influence index of each of the factor relating to the application characteristic and the factor relating to the computing resource through the PCA based on the normalized value. Otherwise, a technique such as the factor analysis, a Spearman correlation coefficient, Spearman rank correlation coefficient extraction, etc. may be used in addition to the PCA.

The principal component analysis may be performed using the following Equation.

$$Cov(J) = \frac{1}{n-1}(J \cdot J^T)$$
$$Cov(J)v_\lambda = \lambda v_\lambda$$

Here, Cov(J) is a covariance matrix of a matrix J, the matrix J is an [n×d] matrix having the n number of task profiles and the d number of factors, and $J^T$ is a transposed matrix of the matrix J. Further, $\lambda$ is an eigen value, and $v_\lambda$ is an eigen vector.

The cloud resource management device may select a first representative factor having the largest influence index among the factors relating to the application characteristic and may select a second representative factor having the largest influence index among the factors relating to the computing resource, based on the calculated result (Step S420). Further, the cloud resource management device may select a representative task profile using an eigen vector $v_\lambda$ of the first representative factor having the largest influence index and may further select an additional representative task using an eigen vector $v_\lambda$ of the second representative factor, based on the previously-performed calculated result.

The cloud resource management device may select a task profile having the first representative factor value equal to that of a requested task among the previously-performed task profile (Step S430).

The cloud resource management device may select one task profile among the selected task profiles based on the second representative factor (Step S440).

The cloud resource management device may allocate computing resources corresponding to the selected one task profile, to the requested task (Step S450). At this time, the cloud resource management device may identify a task profile having a distributed size equal to or larger than a predetermined reference value and a type of VM corresponding to a task profile commonly included in the selected task profile, and may dispose the identified VM in a computing resource corresponding to the selected one task profile.

After executing the requested task, the cloud resource management device may compare an execution time period of the executed task with an execution time period of the selected task profile to evaluate the executed task, based on the allocated computing resource (Step S460). At this time, the cloud resource management device may perform the evaluation when an evaluation result of the executed task is that it succeeded.

Figure 5:
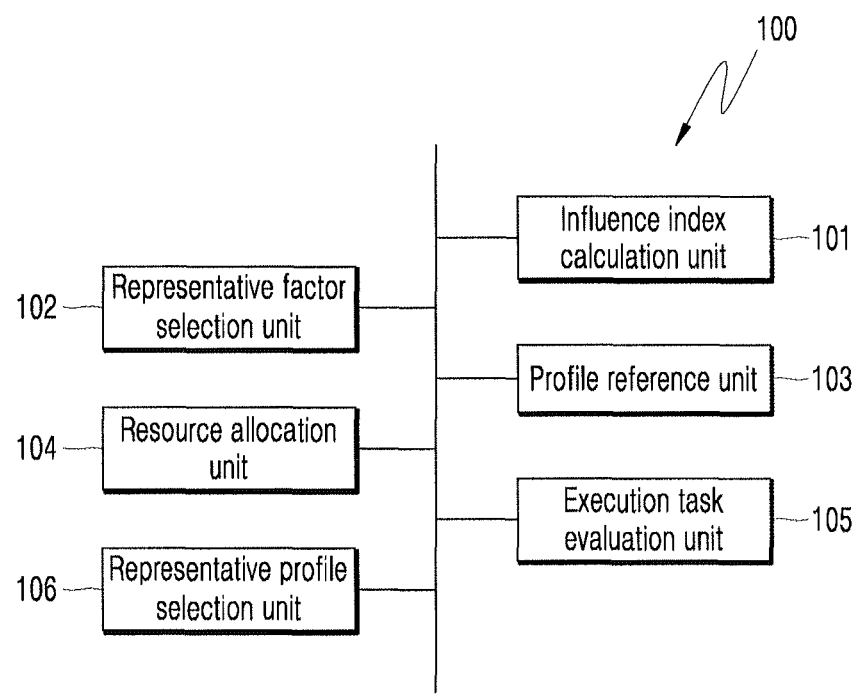
FIG. 5 is a block diagram illustrating a cloud resource management device according to an embodiment of the present disclosure.

FIG. 5 is a block diagram illustrating a cloud resource management device according to an embodiment of the present disclosure.

A cloud resource management device 100 according to an embodiment of the present disclosure may include an influence index calculation unit 101, a representative factor selection unit 102, a profile reference unit 103, a resource allocation unit 104, an execution task evaluation unit 105 and a representative profile selection unit 106.

The cloud resource management device 100 may perform the method of allocating cloud resources, which has been described in FIGS. 1 to 4.

The influence index calculation unit 101 may calculate a factor relating to an application characteristic and an influence index of each factor relating to a computing resource, by analyzing the previously-performed task profile. To this end, the influence index calculation unit 101 may define a factor to be performed by a user and relating to the application characteristic and a factor relating to a computing resource in which tasks are performed, by considering an aspect most closely related to a task performance of an application scheduled to be performed.

The factor relating to the application characteristic may include at least one of a parameter required for execution of an application, a task size and a length. Further, the factor relating to the computing resource may include at least one of a CPU performance, a memory size and a network bandwidth.

At this time, the influence index calculation unit 101 may normalize a value of each of the factor relating to the application characteristic and the factor relating to the computing resource, and then calculate the influence index of each of the factor relating to the application characteristic and the factor relating to the computing resource through principal component analysis based on the normalized value. In this case, the principal component analysis may be performed using the following Equation.

$$\mathrm{Cov}(J) = \frac{1}{n-1}(J \cdot J^T)$$
$$\mathrm{Cov}(J)v_\lambda = \lambda v_\lambda$$

Here, Cov(J) is a covariance matrix of a matrix J, the matrix J is an [n×d] matrix having n number of task profiles and d number of factors, and $J^T$ is a transposed matrix of the matrix J.

The influence index calculation unit 101 calculates an eigen value and an eigen vector established by the Equation, through the Equation, using the covariance matrix.

$\lambda$ is an eigen value, and $v_\lambda$ is an eigen vector.

The representative factor selection unit 102 may select a first representative factor having the largest influence index among the factors relating to the application characteristic and a second representative factor having the largest influence index among the factors relating to the computing resource, based on the calculated result.

The profile reference unit 103 may select a task profile having the first representative factor value equal to that of a requested task among the previously-performed task profile, and may select one task profile among the selected task profiles based on the second representative factor.

The representative profile selection unit 106 may extract a representative task using the largest eigen value and eigen vector among the d number of pairs of calculated eigen values and eigen vectors. For example, the representative profile selection unit 106 may select a task profile having the first representative factor value equal to that of a requested task among the previously-performed task profile, and may select one task profile among the selected task profiles based on the second representative factor.

The resource allocation unit 104 may allocate computing resources corresponding to the selected one task profile, to the requested task. The resource allocation unit 104 may identify a task profile having a principal component point equal to or larger than a predetermined reference value and a type of VM corresponding to a task profile commonly included in the selected task profile, and may dispose the identified VM in a computing resource corresponding to the selected one task profile.

After executing the requested task, the execution task evaluation unit 105 may compare an execution time period of the executed task with an execution time period of the selected task profile to evaluate the executed task, based on the allocated computing resource. At this time, the execution task evaluation unit 105 may evaluate the executed task when an execution result of the executed task is that it succeeded.

Although exemplary embodiments of the present invention have been described for illustrative purposes, those skilled in the art will appreciate that various modifications and changes may be made to the present invention by adding, changing, deleting, or supplementing constituent elements without departing from the scope and spirit of the present invention, and such modifications and changes may also fall within the present invention.

What is claimed is:

1. A method of allocating a cloud resource by a cloud resource management device, the method comprising:
    calculating an influence index of each of at least one characteristic factor relating to an application characteristic and at least one resource factor relating to a computing resource, by analyzing a previously-performed task profile, the analysis including calculating the influence index of each characteristic factor and each resource factor by performing a correlation analysis between the characteristic factors and the resource factors;
    selecting a first representative factor having a largest influence index among the characteristic factors relating to the application characteristic and a second representative factor having a largest influence index among the resource factors relating to the computing resource, based on the calculated result;
    normalizing an application parameter corresponding to the first representative factor among application parameters of a requested task;
    selecting a task profile having a normalization value equal to the normalized parameter value of the requested task among the previously-performed task profiles, with respect to the first representative factor;
    selecting one task profile among the selected task profiles based on the second representative factor;
    allocating a computing resource corresponding to the selected one task profile to the requested task; and
    after executing the requested task based on the allocated computing resource, evaluating the executed task by comparing an execution time period of the executed task with an execution time period of the selected task profile.

2. The method of claim 1, wherein the calculating of the influence index comprises normalizing a value of each of the factor relating to the application characteristic and the factor relating to the computing resource, and then calculating an influence index of each of the factor relating to the application characteristic and the factor relating to the computing resource through principal component analysis based on the normalized value.

3. The method of claim 2, wherein the principal component analysis is performed using the following Equation, $$\text{Cov}(J) = \frac{1}{n-1}(J \cdot J^T) \text{ and}$$

$$\text{Cov}(J)v_\lambda = \lambda v_\lambda,$$

here, Cov(J) is a covariance matrix of the matrix J, the matrix J is an [n×d] matrix having the n number of task profiles and the d number of factors, $J^T$ is a transposed matrix of the matrix J, $\lambda$ is an eigen value, and $v_\lambda$ is an eigen vector.

4. The method of claim 1, wherein the evaluating of the executed task comprises:
when a difference between the execution time period of the executed task and the execution time period of the selected task profile is equal to or larger than a preset threshold value, decreasing an evaluation value of a profile corresponding to the executed task, and
when the difference between the execution time period of the executed task and the execution time period of the selected task profile is smaller than the preset threshold value, increasing the evaluation value of the profile corresponding to the executed task.

5. The method of claim 4, wherein the evaluating of the executed task is performed when an execution result of the executed task is that it succeeded.

6. The method of claim 1, wherein the factor relating to the application characteristic comprises at least one of a parameter required for execution of an application, a task size and a length.

7. The method of claim 1, wherein the factor relating to the computing resource comprises at least one of a Central Processing Unit (CPU) performance, a memory size and a network bandwidth.

8. A cloud resource management device comprising:
an influence index calculation unit configured to calculate an influence index of each of at least one characteristic factor relating to an application characteristic and at least one resource factor relating to a computing resource, by analyzing a previously-performed task profile, the analysis including calculating the influence index of each characteristic factor and each resource factor by performing a correlation analysis between the characteristic factors and the resource factors;
a representative factor selection unit configured to select a first representative factor having a largest influence index among the characteristic factors relating to the application characteristic and a second representative factor having a largest influence index among the resource factors relating to the computing resource, based on the calculated result;
a profile reference unit configured to select a task profile having the first representative factor value equal to that of the requested task among the previously-performed task profiles, and to select one task profile among the selected task profile based on the second representative factor;
a resource allocation unit configured to allocate a computing resource corresponding to the selected one task profile to the requested task; and
an execution task evaluation unit configured to, after executing the requested task based on the allocated computing resource, evaluate the executed task by comparing an execution time period of the executed task with an execution time period of the selected task profile.

9. The cloud resource management device of claim 8, wherein the influence index calculation unit normalizes a value of each of the factor relating to the application characteristic and the factor relating to the computing resource, and then calculates an influence index of each of the factor relating to the application characteristic and the factor relating to the computing resource through principal component analysis based on the normalized value.

10. The cloud resource management device of claim 9, wherein the principal component analysis is performed using following Equation, $$\text{Cov}(J) = \frac{1}{n-1}(J \cdot J^T) \text{ and}$$

$$\text{Cov}(J)v_\lambda = \lambda v_\lambda,$$

here, Cov(J) is a covariance matrix of the matrix J, the matrix 3 is an [n×d] matrix having n number of task profiles and d number of factors, $J^T$ is a transposed matrix of the matrix J, $\lambda$ is an eigen value, and $v_\lambda$ is an eigen vector.

11. The cloud resource management device of claim 8, wherein the execution task evaluation unit decreases an evaluation value of a profile corresponding to the executed task when a difference between the execution time period of the executed task and the execution time period of the selected task profile is equal to or larger than a preset threshold value, and increases the evaluation value of the profile corresponding to the executed task when the difference between the execution time period of the executed task and the execution time period of the selected task profile is smaller than the preset threshold value.

12. The cloud resource management device of claim 11, wherein the execution task evaluation unit the evaluates the executed task when an execution result of the executed task is that it succeeded.

13. A non-transitory computer-readable recording medium comprising commands which perform a method of allocating a cloud resource by a cloud resource management device, comprising:
calculating an influence index of each of at least one characteristic factor relating to an application characteristic and at least one resource factor relating to a computing resource, by analyzing a previously-performed task profile, the analysis including calculating the influence index of each characteristic factor and each resource factor by performing a correlation analysis between the characteristic factors and the resource factors;
selecting a first representative factor having a largest influence index among the characteristic factors relating to the application characteristic and a second representative factor having a largest influence index among the resource factors relating to the computing resource, based on the calculated result;
normalizing an application parameter corresponding to the first representative factor among application parameters of a requested task;
selecting a task profile having a normalization value equal to the normalized parameter value of the requested task among the previously-performed task profiles, with respect to the first representative factor;
selecting one task profile among the selected task profiles based on the second representative factor;

allocating a computing resource corresponding to the selected one task profile to the requested task; and after executing the requested task based on the allocated computing resource, evaluating the executed task by comparing an execution time period of the executed task with an execution time period of the selected task profile.

\* \* \* \* \*